Dec. 30, 1924.
G. A. WIKANDER
1,521,210
GUIDING ATTACHMENT FOR BRILLIANT VIEW FINDERS
Filed May 31, 1921
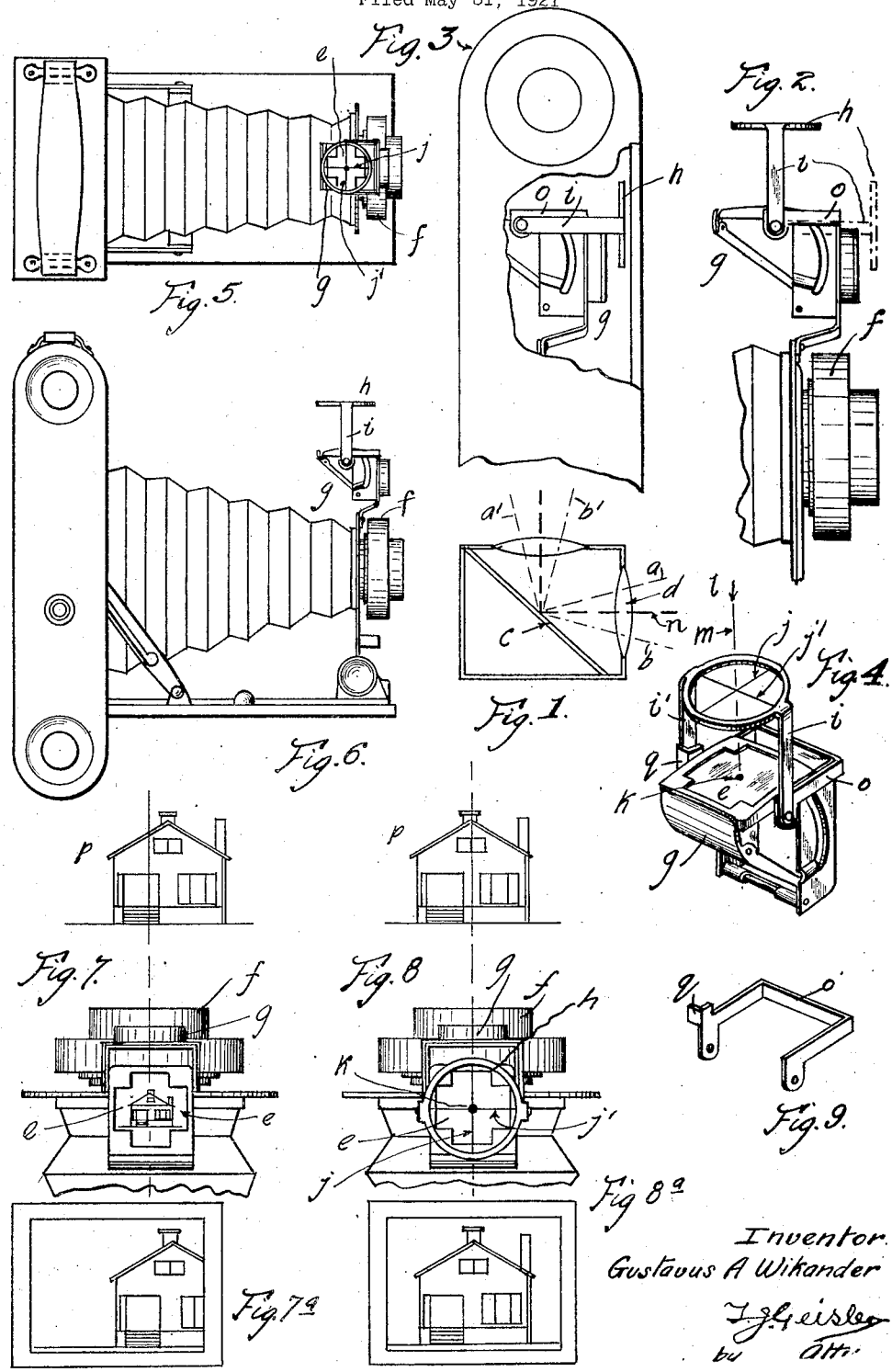

Patented Dec. 30, 1924.

1,521,210

UNITED STATES PATENT OFFICE.

GUSTAVUS A. WIKANDER, OF PORTLAND, OREGON.

GUIDING ATTACHMENT FOR BRILLIANT VIEW FINDERS.

Application filed May 31, 1921. Serial No. 473,678.

*To all whom it may concern:*

Be it known that I, GUSTAVUS A. WIKANDER, a citizen of the United States, and a resident of the city of Portland, county of Multnomah, and State of Oregon, have invented a certain new and useful Improvement in Guiding Attachments for Brilliant View Finders, of which the following is a specification.

My invention has for its purpose the improvement of the so-called brilliant viewfinder. The construction of this view finder is diagrammatically shown by Fig. 1 in the accompanying drawings. As stated in Cassell's Cyclopedia of Photograph, Ed. 1912, P. 556, under View Finder:—"An unfortunate peculiarity of the brilliant finder, in its simplest form, is that the amount of image included varies slightly according to the position of the observer's eye." The peculiarity so referred to is diagrammatically illustrated in Fig. 1 by the broken lines $a$, $a'$, and $b$, $b'$. $d$ and $e$ in Fig. 1 represent the usual lenses. In other words, this view finder by itself is deceptive to the photographer; and he will frequently find that a desirable part of the image has been excluded from the film or plate, thus producing a chopped off appearance in the photograph, due to the fact that he was insufficiently guided by the view-finder to properly direct his camera towards the object to be photographed. It is, therefore, necessary to provide auxiliary means for so guiding the photographer in positioning his camera that the axis of his eye will be brought into coincidence with the axis of the lens, as reflected by the mirror $c$. To provide such means is the main object of my invention.

It is further my object that the means provided for that purpose are not only simple in construction, but also especially so in operation. In brief, my invention functions to quickly and effectively guide the photographer in correctly positioning his camera, without any apparent conscious effort on his part.

The devices by which I attain my object are illustrated in the accompanying drawings, in which:

Fig. 1 is a diagrammatic representation of the lenses of a view finder as now constructed;

Fig. 2 shows a side elevation of the lens carrying part of the bellows of a foldable pocket camera provided with a brilliant view-finder, with my attachment applied to the latter; this view also illustrates by dotted outline how my attachment may be positioned to be out of the way, when the bellows of the camera is to be moved in to its housing;

Fig. 3 is a diagrammatic fragmentary view of said type of camera folded, with parts broken away to show my attachment arranged in its out of the way or inoperative position;

Fig. 4 shows a perspective of a brilliant view-finder detached from the frame of the lens of the camera, and provided with my attachment; this view illustrates also the use of my invention;

Figs. 5 and 6 are respectively a plan view and a side elevation of said type of camera having a brilliant view finder and my attachment applied to the latter;

Figs. 7 and 8 show a fragmentary top view of the lens carrying end of the bellows of a camera provided with a brilliant view-finder, which in Fig. 7 is without my attachment, and in Fig. 8 has such attachment, these figures also show the views transmitted to the lens; and the associated view, Figs. 7ª and 8ª show respectively a likely undesirable result due to the improper positioning of the camera for the lack of my attachment, and the correct effect of which is assured by the use of my attachment; and Fig. 9 shows a detail of construction of my attachment.

In the several views shown, $f$ represents the lens-frame carried by the bellows, and on the lens frame is mounted the brilliant view finder $g$, of the usual construction. My attachment comprises an annular frame $h$ supported by legs $i$, $i'$ pivotally fastened to the frame of the brilliant view finder $g$, so that my attachment may be arranged out of the way as shown by Fig. 3 and also by broken outline in Fig. 1. On the annular frame $h$ are affixed hair like cross wires or members $j$ and $j'$, the point of intersection of which serves as a center to be alined with the spot $k$, centrally placed on the upper or sighting lens $e$ of the brilliant view-finder.

While the frame $h$ could be made rectangular, it is purposely made annular, since that construction tends to guide the eye to the center of the frame, hence to the point of intersection of the cross-wires, without any conscious effort on the part of the photographer. The use of my attachment is illustrated by Fig. 4. The arrow $l$ represents the axis of the eye of the photographer which is to be alined as indicated by the arrow $l$, and the broken line $m$ extending therefrom, that is to say so as to pass thru the spot $k$ of the sighting lens $e$ of the brilliant view-finder; and when the axis of the eye is so alined it will coincide with axial ray of light $n$ transmitted thru the lens $d$ of the brilliant view-finder, as reflected by the mirror $c$. (See Fig. 1.)

A most likely, undesirable result of the use of said brilliant view finder without means for guiding the eye is illustrated by Figs. 7 and 7ª, the desired object to be photographed being assumed to be a house $p$. It will be noted that the image of such house shown in the sighting lens $e$ of said view finder seems properly centered, but, notwithstanding, it will frequently be found that the image has been improperly centered on the sensitized film or plate of the camera, so as to produce the chopped off appearance shown by Fig. 7ª. On the other hand, by the use of my attachment, assuming the same object is to be photographed, by alining the axis of the eye, in a manner similar to the sighting of a gun, as it were, so as to pass thru the intersection of the cross wires $j$, $j'$, and the spot $k$ on the sighting lens $e$ of said view-finder, the proper positioning of the camera is assured, and thereby the proper centering of the image of the object on the sensitized film or plate is also assured, as illustrated by Figs. 8 and 8ª.

In practice I have found it convenient to pivot the legs $i$, $i'$ of my attachment on a yoke or mounting piece $o$ which is shown by itself in Fig. 9, and which is adapted to be readily placed on the frame of the brilliant view-finder as illustrated by the drawings, and is secured in such position in any convenient manner.

In order to assure that the pivoted legs $i$, $i'$ will be placed in perpendicular alinement with the sighting lens $e$ of said view-finder,—which alinement is essential in order to assure the efficient working of my device, I provide a stop $q$, which may be a part of the mounting piece $o$.

I claim:

1. In a folding camera, a reflective view finder, a frame having hair like crossing members, the intersection of which is located in the center of said frame supported in a plane parallel with but spaced from the sighting lens of said finder, a mounting piece adapted to clamp the sides of said view finder, the sighting lens of the view finder being provided with a mark, centrally located with which to aline said point of intersection.

2. In a folding camera, a reflective view finder, a frame having hair like crossing members, the intersection of which is located in the center of said frame supported in a plane parallel with but spaced from the sighting lens of said finder, said frame supported by legs pivoted in the middle of said view finder, the sighting lens of the view finder being provided with a mark, centrally located with which to aline said point of intersection.

3. In a folding camera, a reflective view finder, a frame having hair like crossing members, the intersection of which is located in the center of said frame supported in a plane parallel with but spaced from the sighting lens of said finder, a mounting piece adapted to clamp the sides of said view finder, said frame supported by legs pivoted to the mounting piece in the middle of said view finder, the sight lens of the view finder being provided with a mark centrally located with which to aline said point of intersection.

4. In a folding camera, a reflective view finder, a frame having hair like crossing members, the intersection of which is located in a plane parallel with but spaced from the sighting lens of said finder, a mounting piece adapted to clamp the sides of said view finder, said frame supported by legs pivoted to the mounting piece in the middle of said view finder but slightly below its upper edge, the sight lens of the view finder being provided with a mark centrally located with which to aline said point of intersection.

5. In a folding camera, a reflective view finder, a frame having hair like crossing members, the intersection of which is located in the center of said frame supported in a plane parallel with but spaced from the sighting lens of said finder, a mounting piece adapted to clamp the sides of said view finder, said frame supported by legs pivoted to the mounting piece in the middle of said view finder but slightly below its upper edge, a stop to limit the movement of said legs thereby to position said frame, the sight lens of the view finder being provided with a mark centrally located with which to aline said point of intersection.

6. In a reflective view finder, a frame having hair like crossing members, the intersection of which is located in the center of said frame supported in a plane parallel with but spaced from the sighting lens of said finder, the sighting lens of the view finder being provided with a mark, centrally located with which to aline said point of intersection.

7. In a reflective view finder, a frame having hair like crossing members, the intersection of which is located in the center of said frame supported in a plane parallel with but spaced from the sighting lens of said finder, a mounting piece adapted to clamp the sides of said view finder, the sighting lens of the view finder being provided with a mark, centrally located with which to aline said point of intersection.

8. In a reflective view finder, a frame having hair like crossing members, the intersection of which is located in the center of said frame supported in a plane parallel with but spaced from the sighting lens of said finder, a mounting piece adapted to clamp the sides of said view finder, said frame supported by legs pivoted to the mounting piece in the middle of said view finder, the sighting lens of the view finder being provided with a mark, centrally located with which to aline said point of intersection.

9. In a reflective view finder, a frame having hair like crossing members, the intersection of which is located in the center of said frame supported in a plane parallel with but spaced from the sighting lens of said finder, a mounting piece adapted to clamp the sides of said view finder, said frame supported by legs pivoted to the mounting piece in the middle of said view finder but slightly below its upper edge, a stop on the mounting piece to limit the movement of said legs thereby to position said frame, the sight lens of the view finder being provided with a mark centrally located with which to aline said point of intersection.

10. An attachment to the reflective view finder of a folding camera consisting of, a mounting piece attached to clamp the sides of the view finder, a frame having hair like crossing members the intersection of which is located in the center of said frame supported in a plane parallel with but spaced from the sighting lens of said finder, said frame supported by legs pivoted at the middle of said mounting piece, the sighting lens of the finder being provided with a mark centrally located with which to aline said point of intersection, whereby, when said frame is moved about said pivot so as to assume the point normal to said mounting piece, the legs will lie below the surface thereof.

11. An attachment to the reflective view finder of a folding camera consisting of, a mounting piece attached to clamp the sides of the view finder, a frame having hair like crossing members the intersection of which is located in the center of said frame supported in a plane parallel with but spaced from the sighting lens of said finder, said frame supported by legs pivoted at the middle of said mounting piece but slightly below its upper edge, the sighting lens of the finder being provided with a mark centrally located with which to aline said point of intersection, whereby, when said frame is moved about said pivot so as to assume the point normal to said mounting piece, the legs will lie below the surface thereof.

12. An attachment to the reflective view finder of a folding camera consisting of a mounting piece attached to clamp the sides of the view finder, a frame having hair like crossing members the intersection of which is located in the center of said frame supported in a plane parallel with but spaced from the sighting lens of said finder, said frame supported by legs pivoted at the middle of said mounting piece but slightly below its upper edge, a stop on said mounting piece adapted to limit the movement of said legs thereby to position said frame, the sighting lens of the finder being provided with a mark centrally located with which to aline said point of intersection, whereby, when said frame is moved about said pivot so as to assume the point normal to said mounting piece, the legs will lie below the surface thereof.

13. An attachment to the reflective view finder of a folding camera consisting of, a mounting piece adapted to be clamped to the view finder, a frame having hair like crossing members, the intersection of which is located in the center of said frame supported in a plane parallel with but spaced from the sighting lens of said finder, the sighting lens of the finder being provided with a mark centrally located with which to aline said point of intersection.

14. An attachment to the reflective view finder of a folding camera consisting of, a mounting piece adapted to be clamped to the view finder, a frame having hair like crossing members, the intersection of which is located in the center of said frame supported in a plane parallel with but spaced from the sighting lens of said finder, said frame supported by legs pivoted at the middle of said mounting piece, the sighting lens of the finder being provided with a mark centrally located with which to aline said point of intersection.

GUSTAVUS A. WIKANDER.